(No Model.)
E. APPERSON.
SAW SWAGE.
No. 516,693. Patented Mar. 20, 1894.
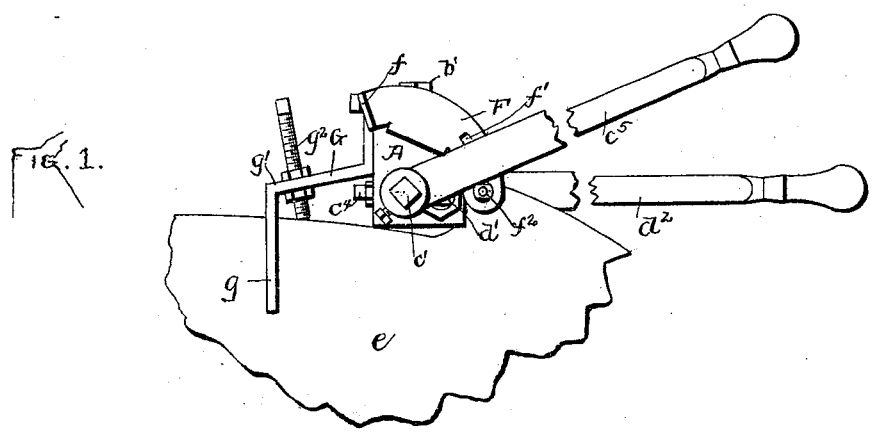
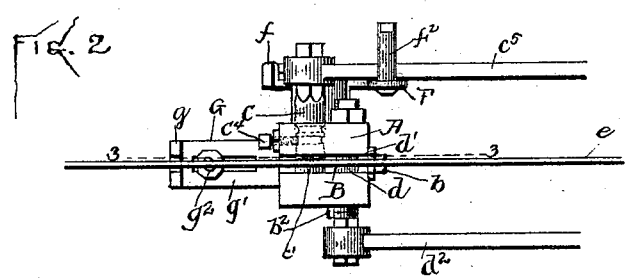
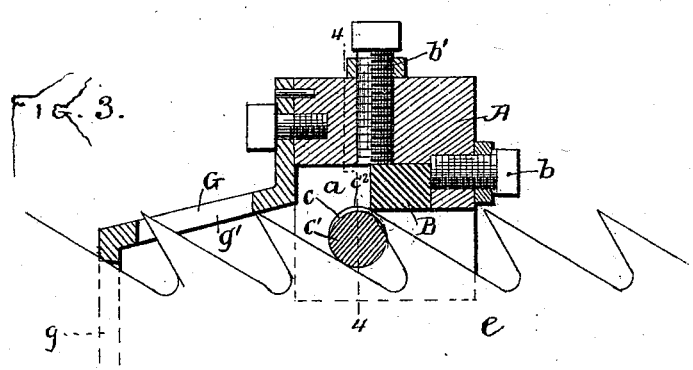
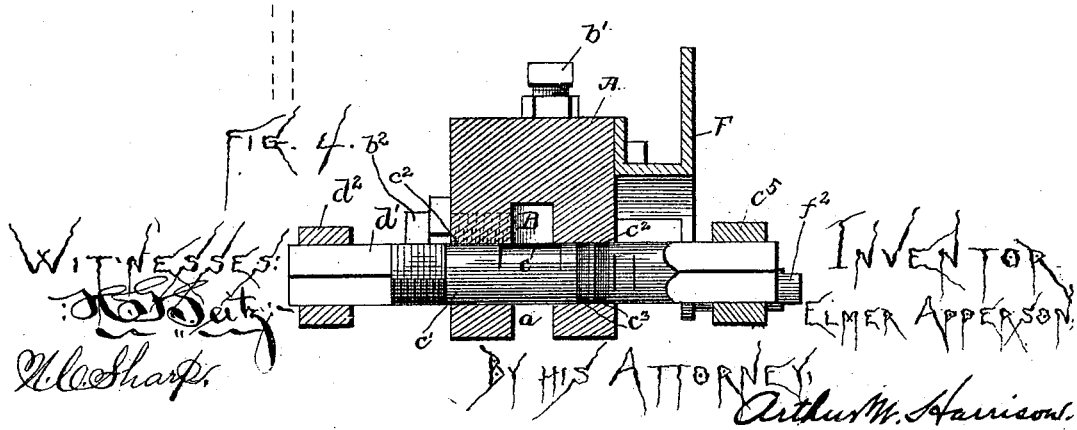
WITNESSES:
INVENTOR
ELMER APPERSON
BY HIS ATTORNEY,
Arthur W. Harrison.

UNITED STATES PATENT OFFICE.

ELMER APPERSON, OF KOKOMO, INDIANA.

SAW-SWAGE.

SPECIFICATION forming part of Letters Patent No. 516,693, dated March 20, 1894.

Application filed April 25, 1893. Serial No. 471,791. (No model.)

*To all whom it may concern:*

Be it known that I, ELMER APPERSON, of Kokomo, in the county of Howard and State of Indiana, have invented new and useful Improvements in Saw-Swages; and I do hereby declare the following to be a full, clear, and exact description of said invention, reference being had to the accompanying drawings, and to the letters of reference marked thereon, which form a part of this specification.

My invention relates to saw-swages and relates particularly to that class of such devices in which a rotating cam shaped swage-die acts to spread the tooth operated upon against a stationary but adjustable anvil-die.

The objects of my invention are to simplify the construction and enhance the durability and effectiveness of the tool, and to these ends my invention consists in the construction and combination of parts as hereinafter described and claimed.

In the accompanying drawings, in which similar reference letters indicate corresponding parts in all the views, Figure 1— is a side elevation of my complete swage, shown as applied to a circular saw. Fig. 2— is an inverted plan view of the same. Fig. 3 is a sectional view on line 3—3 of Fig. 2, somewhat enlarged, and showing a band saw in connection therewith. Fig. 4— is a transverse section on line 4—4 of Fig. 3.

The casting or block A has a recess $a$ extending along its under side to receive the saw, said recess being cut deeper at one portion than another to form the space for the anvil block or die B. This block is rectangular in vertical longitudinal direction and the base of the recess $a$ along which the die may be moved and set, is parallel, or substantially so, with the top or outside of the block. As shown in Fig. 3, the construction is such that the anvil die may be moved along and set so that the swaging action can take place against any portion of its longer side, thereby furnishing an extended area for adjustments to present unworn surfaces. Set screws $b$ $b'$ and $b^2$, tapped through the block A operate against the end, top and side, respectively, of the die to hold it in any adjusted position. By means of the adjusting screw $b$, the anvil-die B may be adjusted directly across the swage-die C, or in the direction of the plane of its pressure-receiving surface, to bring the point of the anvil-die into different positions relatively to the swage-die, or to bring new portions of the former into position adjacent to the latter. The screw $b'$ permits adjustment of the anvil-die directly toward the swage-die or in a direction at a right angle to the first mentioned adjustment. These two movements permit of a universal adjustment, as will be readily understood, which will adapt the tool to swage teeth of a great variety of sizes and types of saws.

The swage die consists of a circular rod $c'$ fitted to circular openings $c^2$ in the sides of the block A below the anvil die, and having a cut away or reduced portion $c$ forming the swage die proper; this reduced portion extends a distance along the rod greater than the width of the recess $a$, and said rod is provided with a plurality of annular grooves $c^3$ into either one of which may be projected the end of a small screw $c^4$ to prevent longitudinal, but permit rotary movement of the rod. By loosening the screw $c^4$, moving the rod longitudinally, and again turning in the screw, a new part of the swage die may be brought into operative position.

$c^5$ indicates the handle or lever by which the swage die is rotated in the operation of swaging a saw tooth, all as will be readily understood from the drawings without further description.

$d$ and $d'$ represent the binding screws extending through opposite sides of the block A to bite on opposite sides of the saw $e$ the teeth of which are to be swaged. The outer end of one screw is provided with a handle or lever $d^2$ for turning it into or out of contact with the saw.

To one side of the block A is attached a segment shaped bracket F, having a lateral projection or lug $f$ at one end and a slot $f'$ at the other, and a pin $f^2$ is adjustably set in said slot. The adjustment of the parts is such that the pin $f^2$ forms a point of rest for the lever $c^5$ in its normal position, while the lug $f$ forms a stop to prevent further movement of the lever when the swaging operation is completed. And yet, owing to the lever moving over the face of the bracket, no undue friction will exist, and the lever may be as readily removed from the rod $c'$ as if the bracket did not exist.

Attached to the end of the block A is an angle bracket G having its vertical part $g$ forked to fit over the saw-blade, and having its horizontal portion $g'$ slotted to receive a bearing screw $g^2$ provided with jam nuts above and below the part $g'$ to secure said screw in any adjusted position vertically or horizontally. This screw $g^2$ by bearing on the edge of the saw blade, determines the angle at which the point of the tooth to be swaged enters between the dies. The location of the holes $c^2$ is such, relatively to the position of the operative face of the anvil-die, that the swage die $c$ is below the plane of said anvil-die face, thus enabling the swaging action to take place against any portion of said face according to the adjustment of the anvil die.

By means of the three set screws $b$, $b'$ and $b^2$, the anvil-die may be readily adjusted; or it may be quickly removed on loosening that screw which operates against its side.

Having now described my invention, what I claim is—

1. A saw-swage comprising in its construction a block having a recess, a rectangular anvil-die located in said recess, a swage-die mounted in said block and below the plane of the operative face of the anvil-die, and means, as set screws, for imparting a universal adjustment to the anvil-die, one of the adjustments being in the direction of said operative face, substantially as described.

2. The combination with the block A having an anvil-die and a rotary swage-die, of a handle attached to the latter, the bracket F secured to one side of the block A, said bracket having a lug $f$ at one end and a slot $f'$ at the other end, and the pin $f^2$ adjustably secured in said slot, substantially as described.

In testimony whereof I affix my signature in presence of two subscribing witnesses.

ELMER APPERSON.

Witnesses:
N. B. SMITH,
A. B. KIRKPATRICK.